July 7, 1942.　　　　L. DEL BENE　　　　2,288,994
WELDING ELECTRODE HOLDER
Filed Nov. 21, 1941
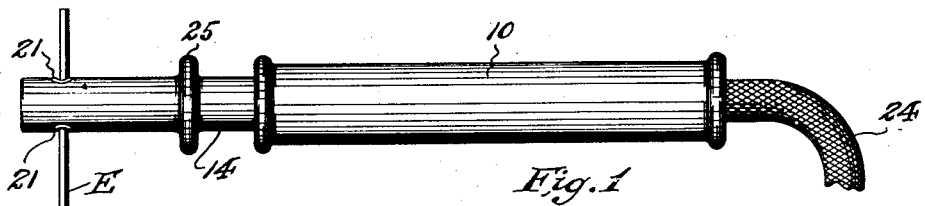
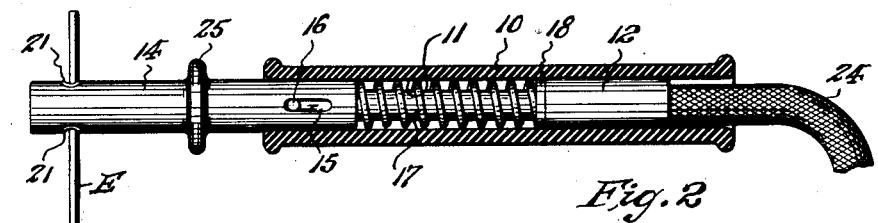
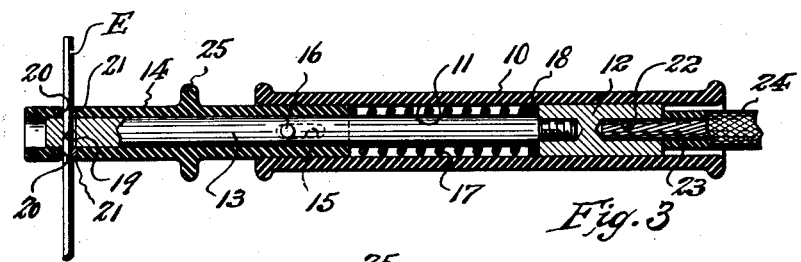
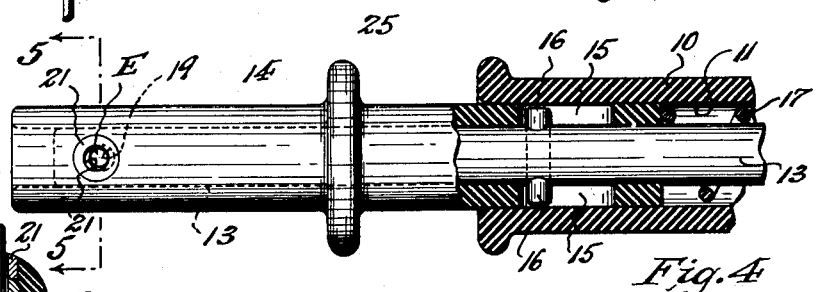
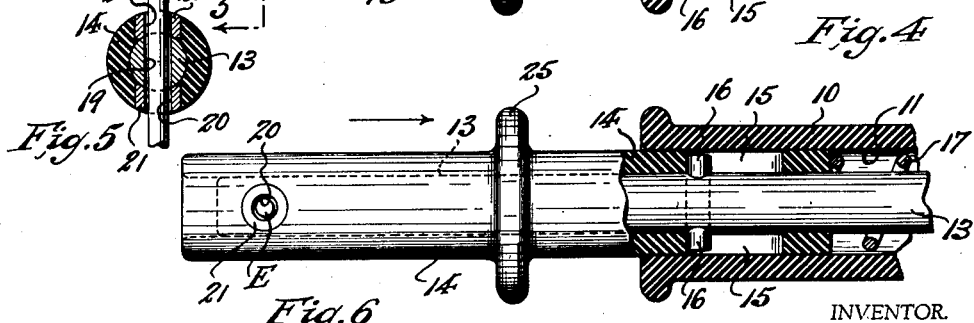
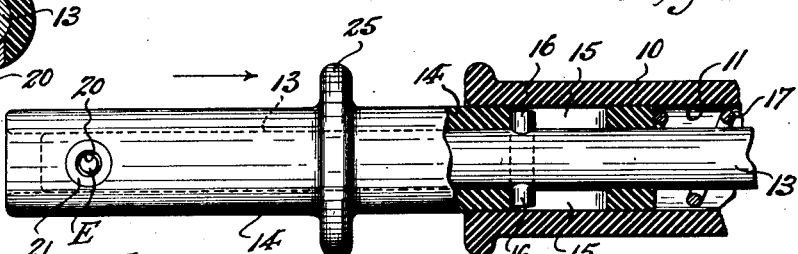
INVENTOR.
Leon Del Bene,
BY George D. Richards,
ATTORNEY.

Patented July 7, 1942

2,288,994

UNITED STATES PATENT OFFICE 2,288,994

WELDING ELECTRODE HOLDER

Leon Del Bene, Ridgefield, N. J.

Application November 21, 1941, Serial No. 419,837

4 Claims. (Cl. 219—8)

This invention relates to improvements in electrode holders for use in electric welding operations; and, the invention has reference, more particularly, to that type of electrode holder having electric current serving means to conduct welding current to and through the electrode held thereby.

The invention has for an object to provide a novel construction of electrode holder adapted to be grasped in a hand of the user, the same being so constructed and arranged that all electrically conductive parts thereof, except the electrode held thereby, are entirely enclosed within and shielded by insulating or non-conductive members.

The invention has for another object to provide a simple and inexpensive construction of electrode holder involving a minimum number of parts, and these of very simple structure; said parts including a rigid internal conductor rod mounted in axially extending fixed relation to a hand grip member of insulating material for outward extension therefrom, and over the outer portion of which is slidably arranged a spring projected insulating sheath; said sheath and conductor rod having alignable transverse electrode receiving openings or passages, whereby an electrode passed therethrough may be both mechanically gripped and held in good electrical contact with the conductor rod by the spring urged thrust of the sheath; said sheath and conductor rod having cooperative stop means to limit relative movement of the former to the latter, and particularly so as to limit inward movement of the sheath to that which will bring its electrode receiving openings or passages in alignment with the electrode receiving opening or passage of the conductor rod when said sheath is pushed or pulled back against the tension of its thrust spring.

The invention has for a further object to provide an external sheath made of insulating material which is slidably engaged over the conductor rod, said sheath having electrode receiving openings or passages alignable with that of said conductor rod, and said sheath electrode receiving openings or passages being guarded by wear resisting bushings to prevent distortion or undesired enlargement thereof by wear.

Other objects of this invention, not at this time more particularly enumerated, will be understood from the following detailed description of the same.

An illustrative embodiment of this invention is shown in the accompanying drawing, in which:

Fig. 1 is a side elevation of an electrode holder constructed in accordance with the principles of this invention; Fig. 2 is a similar view thereof, but showing the hand grip member thereof in longitudinal section; and Fig. 3 is a horizontal sectional view through the electrode holder, with a portion of the internal conductor rod shown in elevation.

Fig. 4 is a fragmentary view in part elevation and in part longitudinal section, showing the sheath and conductor rod in gripping and holding relation to an electrode element passed therethrough, said view being drawn on an enlarged scale; Fig. 5 is a transverse sectional view, taken on line 5—5 in Fig. 4; and Fig. 6 is a view similar to that of Fig. 4, but showing the sheath retracted relative to the conductor rod so as to release the grip of these parts upon an electrode element passed therethrough.

Similar characters of reference are employed in the above described views, to indicate corresponding parts.

Referring to the drawing, the reference character 10 indicates the hand grip member of the holder. This hand grip member is made of a suitable electrical insulation material and is of substantially tubular form, the axial passage 11 of which is open from end to end. Immovably secured within said hand grip member adjacent to its rearward end is a metallic butt block 12. Affixed to said butt block 12, to extend axially forward through the passage 11 of the hand grip member 10 is a metallic conductor rod 13 of reduced diameter; the forward end portion of which projects for a substantial distance beyond the forward end of said hand grip member 10.

Telescopically slidable over the outer end portion of said conductor rod 13 is a combined insulating sheath and clamp member 14 which is made of a suitable electrical insulation material. This insulating sheath and clamp member 14 is of tubular form, having an inside diameter to slidingly fit over the conductor rod 13, and an outside diameter to slidingly enter and fit within the outer end portion of the hand grip member passage 11. Provided in the wall of the inner end portion of said sheath and clamp member 14 is at least one slot 15, and affixed to said conductor rod 13, in proper location to project into said slot is a lateral stop stud 16. Said slot 15 is of suitable length to permit a desired degree of sliding movement of said sheath relative to said conductor rod. Abutment of the rearward end of said slot 15 against the stop stud 16 operates to limit outward movement of said sheath, while abutment of the forward end of said slot 15 against the stop stud 16 operates to limit inward movement thereof. While a single slot 15 and cooperating stud 16 at one side of the assembled sheath and conductor rod is sufficient, the provision of such operating slots and stop studs on opposite sides of the assembly is preferable.

A compression spring 17 is arranged around the the conductor rod 13 between the butt block 12 and the inner end of said sheath 14, whereby to yieldably thrust the latter outwardly toward its outward limit of movement. A washer 18 of insulation is preferably interposed between the butt block 12 and the rearward end of said spring 17.

Extending diametrically and perpendicularly through the conductor rod 13, adjacent to its outer extremity, is an electrode receiving opening or passage 19. Extending through the walls of said combined sheath and clamp member 14, in rearwardly spaced relation to its outer extremity, are diametrically and perpendicularly aligned electrode receiving openings or passages 20, the same being internally lined with bushings 21 of a wear resisting material, such e. g. as metal, porcelain, or other relatively hard material.

As operatively assembled with the conductor rod 13, the free outer end portion of the combined sheath and clamp member 14 projects a substantial distance beyond the outer extremity of said conductor rod 13, its outward limit of such projection, when no electrode is engaged thereby, being determined by abutment of the rearward end or ends of the slot or slots 15 against the stop stud or studs 16, in which case the electrode receiving openings 20 of the sheath are advanced out of alignment with the electrode receiving opening 19 of the conductor rod. The length of the slot or slots 15, however, is such that when the forward end or ends thereof abut the stop stud or studs 16, upon inward movement of the sheath against the thrust of the spring 17, the electrode receiving openings 20 of said sheath will be automatically registered in alignment with the electrode receiving opening 19 of the conductor 13, so that an electrode F may be inserted and passed through said aligned openings 19—20 ready to be operatively engaged and held by the holder.

Provided in the rearward end of the butt block 12 is a socket 22 to receive the end of a flexible conductor cable 23, by which current is served therethrough to the conductor rod 13. Said cable 23 is suitably covered by an insulating jacket 24 in the customary manner.

When it is desired to mount an electrode F in the holder, the hand grip member 10 is grasped by the operator and the outer end of the combined sheath and clamp member 14 is pushed against any conveniently at hand immovable surface, whereby the latter is forced back or inwardly, against the tension of the thrust spring 17, until the outer end or ends of the stop slot or slots 15 abut the stop stud or studs 16 (see Fig. 6). When the sheath and clamp member 14 is thus disposed and held at its inward limit of movement, the electrode receiving openings 20 of the sheath and clamp member 14 are brought into alignment with the electrode receiving opening 19 of the conductor rod 13. With said electrode receiving openings thus held in alignment, the operator, with his free hand may grasp and insert an electrode E therethrough and into desired adjusted relation to the holder device, whereupon by merely relaxing the thrust of the latter against the engaged immovable surface, the compression spring 17 is permitted to exercise its normal outward thrust upon the combined sheath and clamp member 14, with the result that the electrode receiving openings 20 of the latter are outwardly moved relative to the electrode receiving opening 19 of the conductor rod 13, so that one side of the inserted electrode E is strongly gripped by an outer side of the receiving opening 19 and the opposite side of said inserted electrode E is strongly gripped by the inner sides of the bushed receiving openings 20, thus strongly gripping and holding the electrode attached to the holder against longitudinal movement, while at the same time effecting good electrical contact between the current serving conductor rod 13 and said electrode E for delivery of welding current through the latter. From the above it will be obvious that the holder may be very easily and conveniently manipulated by one hand for insertion and engagement of an electrode E, which the operator's other hand is free to handle and manipulate.

It will be apparent that, when the electrode E is thus operatively mounted in and held by the holder device, that all electrically alive parts of the holder, up to the electrode itself, are completely covered by the insulating material of which the hand grip member 10 and combined sheath and clamp member 14 are made. This is of decided advantage to the operator, and provides a maximum protection against risk of accidental electrical shock when manipulating the tool in use.

After an electrode E has been substantially consumed in use, and it is desired to release and discharge therefrom the stud thereof from the tool, the combined sheath and clamp member 14 may again be pushed against any convenient immovable surface so as to retract the same and bring the electrode receiving openings 19—20 into alignment again, thereby allowing the electrode stub to drop out therefrom, or, if desired, the hand grip member 10 may be grasped in one hand and the sheath retracted by the other until said receiving openings 19—20 are aligned. In aid of the latter mode of operation, the sheath 14 may be provided, intermediate its ends, with an annular externally projecting finger piece 25, as shown.

Having now described my invention, I claim:

1. A welding electrode holder comprising a substantially tubular hand grip member of insulating material, a conductive butt block to which electric current is supplied, said butt block being affixed within the rearward end portion of said hand grip member, a conductor rod affixed to said butt block to extend axially outward through said hand grip member with its free end portion externally projected therefrom, a sheath of insulating material slidably engaged over said conductor rod and having its rearward end portion telescopically entered in the outer end portion of said hand grip member, the outer end portion of said sheath extending beyond the outer extremity of said conductor rod, said sheath and conductor rod having cooperative stop means to limit movements of the former relative to the latter, spring means to yieldably thrust the sheath outwardly, and said conductor rod and sheath having electrode receiving openings adapted to be aligned for reception of an electrode when said sheath is retracted to the limit of its inward movement, but adapted to be relatively offset by the spring urged outward movement of said sheath so as to grip the electrode and hold the same in electrical contact with the conductor rod.

2. A welding electrode holder as defined in claim 1, wherein the electrode receiving openings of the sheath are lined with wear resisting bushings.

3. A welding electrode holder comprising, a substantially tubular hand grip member of insulating material, a conductive butt block to which electric current is supplied, said butt block being affixed within the rearward end portion of said hand grip member, a conductor rod affixed to said butt block to extend axially outward through said hand grip member with its free end portion externally projected therefrom, a tubular sheath of insulating material slidably engaged over said conductor rod and having its rearward end portion telescopically entered in the outer end portion of said hand grip member, the outer end portion of said sheath extending beyond the outer extremity of said conductor rod, spring means to yieldably thrust outwardly said sheath, said sheath and conductor rod having cooperating slot and stud stop means at portions thereof enclosed within said hand grip member whereby to limit movements of the sheath relative to the conductor rod, said conductor rod having a diametric electrode passage adjacent to its outer extremity, and said sheath having diametrically aligned electrode receiving openings in its walls, said latter openings being adapted to be aligned with said electrode passage of the conductor rod for the reception of an electrode when the sheath is pushed back to the limit of its inward movement, but adapted to be forwardly offset relative to said conductor rod passage whereby to securely grip the electrode and hold the same in electrical contact with the conductor rod.

4. A welding electrode holder as defined in claim 3, wherein the electrode receiving openings of the sheath are lined with wear resisting bushings.

LEON DEL BENE.